United States Patent
Naumann et al.

(10) Patent No.: US 10,217,592 B2
(45) Date of Patent: Feb. 26, 2019

(54) CIRCUIT BREAKER AND METHOD FOR OPERATION THEREOF

(71) Applicant: Ellenberger & Poensgen GmbH, Altdorf (DE)

(72) Inventors: Michael Naumann, Feucht (DE); Peter Meckler, Hohenstadt/Pommelsbrunn (DE); Erich Fischer, Altdorf (DE); Fabio Pafumi, Schwabach (DE); Thomas Regahl, Nuremberg (DE); Hubert Harrer, Hilpoltstein (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 0 days.

(21) Appl. No.: 15/678,639

(22) Filed: Aug. 16, 2017

(65) Prior Publication Data

US 2017/0345600 A1 Nov. 30, 2017

Related U.S. Application Data

(63) Continuation of application No. PCT/EP2015/079012, filed on Dec. 8, 2015.

(30) Foreign Application Priority Data

Feb. 16, 2015 (DE) ........................ 10 2015 001 945

(51) Int. Cl.
*H01H 71/40* (2006.01)
*H01H 9/02* (2006.01)
(Continued)

(52) U.S. Cl.
CPC .......... *H01H 71/40* (2013.01); *H01H 9/0271* (2013.01); *H01H 9/548* (2013.01);
(Continued)

(58) Field of Classification Search
CPC .......... H02H 5/047; H02H 3/08; H01H 71/40; H01H 37/002
(Continued)

(56) References Cited

U.S. PATENT DOCUMENTS

| 4,573,031 A | 2/1986 | Krasser |
| 4,992,904 A * | 2/1991 | Spencer ................ H01H 9/542 361/13 |

(Continued)

FOREIGN PATENT DOCUMENTS

| CN | 102349124 A | 2/2012 |
| DE | 7039477 U | 1/1971 |

(Continued)

OTHER PUBLICATIONS

Kulha, WO 2014075743; Entire specification and drawings.*
(Continued)

*Primary Examiner* — Dharti H Patel
(74) *Attorney, Agent, or Firm* — Muncy, Geissler, Olds & Lowe, P.C.

(57) ABSTRACT

A circuit breaker having, in a current path, a switching device having a thermal and/or magnetic tripping device for interruption of a current circuit having the current path comprehensive in an event of overcurrent or short-circuit, wherein a functional component of the switching device connected into the current path is bridged by means of a bypass which carries the load current detected by means of a current sensor when the current is below a current threshold, and is shut off when the current threshold is exceeded.

8 Claims, 2 Drawing Sheets

(51) Int. Cl.
*H01H 9/54* (2006.01)
*H01H 71/12* (2006.01)
*H02H 3/08* (2006.01)

(52) U.S. Cl.
CPC ........ *H01H 71/123* (2013.01); *H01H 71/125* (2013.01); *H02H 3/08* (2013.01); *H01H 2071/124* (2013.01)

(58) Field of Classification Search
USPC ........................................ 361/93.1, 103, 105
See application file for complete search history.

(56) References Cited

U.S. PATENT DOCUMENTS

| | | | |
|---|---|---|---|
| 5,689,395 A * | 11/1997 | Duffy | H02H 3/025 361/103 |
| 6,590,489 B1 | 7/2003 | Ullermann et al. | |
| 6,710,698 B1 | 3/2004 | Jehlicka et al. | |
| 7,633,022 B2 * | 12/2009 | Zols | H01H 9/54 200/51 R |
| 7,821,756 B2 * | 10/2010 | Chishima | H02H 3/087 361/93.7 |
| 8,742,828 B2 | 6/2014 | Naumann et al. | |
| 9,509,132 B2 | 11/2016 | Fritsch et al. | |
| 2011/0208450 A1 | 8/2011 | Salka et al. | |
| 2012/0002332 A1 | 1/2012 | Riley | |
| 2013/0162236 A1 | 6/2013 | Yang | |
| 2014/0254052 A1 | 9/2014 | Carlino et al. | |
| 2017/0345600 A1 * | 11/2017 | Naumann | H01H 9/0271 |

FOREIGN PATENT DOCUMENTS

| | | |
|---|---|---|
| DE | 4127412 A1 | 3/1992 |
| DE | 19941699 A1 | 3/2001 |
| DE | 19856707 A1 | 7/2003 |
| DE | 102012018456 A1 | 4/2014 |
| EP | 0151692 A2 | 8/1985 |
| WO | WO 2012 140145 A1 | 10/2012 |
| WO | WO2014075743 A1 | 5/2014 |

OTHER PUBLICATIONS

Jehlicka, DE 19941699; Entire specification and drawings.*
Chinese First Office Action dated May 30, 2018 issued by the Chinese Patent Office in corresponding application 201580068103.4.
European International Search Report dated Mar. 17, 2016 with English Translation.

* cited by examiner

CIRCUIT BREAKER AND METHOD FOR OPERATION THEREOF

This nonprovisional application is a continuation of International Application No. PCT/EP2015/079012, which was filed on Dec. 8, 2015, and which claims priority to German Patent Application No. 10 2015 001 945.7, which was filed in Germany on Feb. 16, 2015, and which are both herein incorporated by reference.

BACKGROUND OF THE INVENTION

Field of the Invention

The invention relates to a circuit breaker comprising, in a current path between an input terminal and a load terminal, a switching device having a thermal and/or a magnetic tripping device for the interruption of a current circuit, which comprises the current path, in the event of overcurrent or short-circuit. It also relates to a method for the low-power loss operation of such a circuit breaker.

Description of the Background Art

A circuit breaker with thermal, magnetic (electromagnetic) or thermal magnetic tripping is typically used as device or equipment protection in information and communication technology as well as for process control and other applications that require reliable functionality in the event of overload and short-circuit.

In the case of a thermal circuit breaker in which the tripping time depends on the magnitude of the overcurrent, a bimetallic or expansion wire element is heated with increasing current strength until the defined trip point is reached. Such a thermal circuit breaker is known, for example, from DE 198 56 707 A1 (which corresponds to U.S. Pat. No. 6,590,489 and is incorporated herein by reference) and EP 0 151 692 A2 (which corresponds to U.S. Pat. No. 4,573,031 and is incorporated herein by reference).

In the case of a thermal-magnetic circuit breaker, the combination of the bimetallic or expansion wire element and a magnetic coil achieves the protective function, whereby the thermal part protects with a time-delayed tripping in case of overload, while the magnetic part responds instantaneously to high overload and short-circuit currents, turning off the faulty circuit within a few milliseconds. Such a circuit breaker is known, for example, from DE 70 39 477 U.

In the conventional art, circuit breakers are known to cause a power loss caused by the internal components, which is released in the form of heat and leads to a temperature increase at the installation location, for example in a control cabinet. In the case of an increasing temperature rise caused by further circuit breakers, cooling of the installation location is necessary since otherwise, it may result in the heating of, for example, lines and other components found in the control cabinet as well as in a reduction in the service life. In addition to the associated expenditure in terms of cooling, an increased energy or current requirement and possible condensation effects at the installation site are also disadvantageous.

SUMMARY OF THE INVENTION

It is therefore an object of the invention to provide a circuit breaker which operates with as low a power loss as possible, as well as a corresponding method for the operation thereof.

In an exemplary embodiment, at least one functional component of the switching device, connected in the current path, is bridged by means of a bypass which carries the load current when said current falls below a current threshold, and is shut off when this threshold value (current threshold) is exceeded. The functional component can be a bimetal of a thermal overcurrent tripping device or a coil of an electromagnetic release.

It is essential that the bypass is of low resistance as compared to the bridged functional component of the circuit breaker. The bypass is therefore preferably realized by means of a switching element connected in parallel with the functional component, which can be a relay or a semiconductor switch and/or a reed contact (reed relay) with an associated control circuit, which in turn is connected to a current sensor.

In an embodiment, the current and/or voltage supply of the control circuit is provided by means of a functional component based on the principle of energy harvesting. This suitably comprises an energy converter for converting the energy supplied by a switch-internal or, alternatively, switch-external source into the supply voltage or into the supply current for the control circuit. In addition, the functional component based on the principle of energy harvesting preferably comprises an energy store. Furthermore, this energy-harvesting functional component may include a current and/or voltage regulator.

With regard to the method for the low power-loss operation of such a circuit breaker with a bypass or bypass circuit, the load current flowing across the current path which is connected to the respective tripping device is detected. The detected load current is compared with a threshold value (current threshold). As long as said current falls below this threshold value or current threshold, the comparatively low-resistance bypass carries the load current with comparatively low power losses. If the threshold value is exceeded, which may indicate or lead to possible overcurrent or a short-circuit event, the bypass is shut off and the load current is routed through the circuit breaker tripping device, which is connected in the current path.

The energy for supplying the control circuit of the switching device and/or the switching element connected in the bypass takes place particularly preferably according to the principle of energy harvesting from a source of energy located in the operational range of the circuit breaker, the harvested energy of which is converted and preferably stored as needed into a supply voltage and/or a supply current for the control circuit.

Depending on the energy source located within the circuit breaker, for example, the field energy of the optionally provided electromagnetic tripping device or the thermal energy from the thermal power of an ohmic resistor in a control circuit of the circuit breaker or potential energy due to an existing potential difference in an electrical/electronic component (ohmic resistance) of the circuit breaker, a coil (magnetic coil), a Peltier element or a potential or voltage converter can be used as an energy converter, and can be integrated into the circuit breaker, in particular in its control circuit.

As an external energy source, thermal energy can again be considered—for example, due to a temperature difference between two adjacent parts—radiation energy, kinetic energy or chemical energy. For technical realization, a Peltier element, a solar cell, a piezo element or a battery are again suitably used. Irrespective of whether an internal and/or an external energy source is used for energy harvesting, this harvested energy is preferably only used for supplying the electronic control circuit and not directly, but only indirectly, for tripping the circuit breaker (protective device).

For the described energy forms, which are used from internal or external sources, they should not be continuously available as electrical energy following the technical implementation in order to obtain the resulting voltages and/or currents for supplying the electronic control circuit. Rather, the harvested energy is stored, for example, by means of a capacitor or an inductor in order to compensate for possible interruption phases. At least in the case of a current flow through the current path and thus via the respective functional element of the circuit breaker, useable heat energy is available via the thermal part of a thermal circuit breaker, and magnetic or electromagnetic field energy is available via the magnetic or electromagnetic part of a magnetic or thermal-magnetic circuit breaker, which is converted and harnessed into the necessary power supply (voltage and/or current) for the control circuit.

The advantages achieved with the invention are, in particular, that on the one hand, by means of a low-resistance bypass (Ecopass) to a functional component which is operationally dissipating electrical energy of a, in particular, thermal and magnetic circuit breaker, the latter operates with a comparatively low power loss and on the other hand, operates particularly low in energy by using the effect or principle of energy harvesting. Both effects (bypass and energy harvesting) are preferably used or implemented in combination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
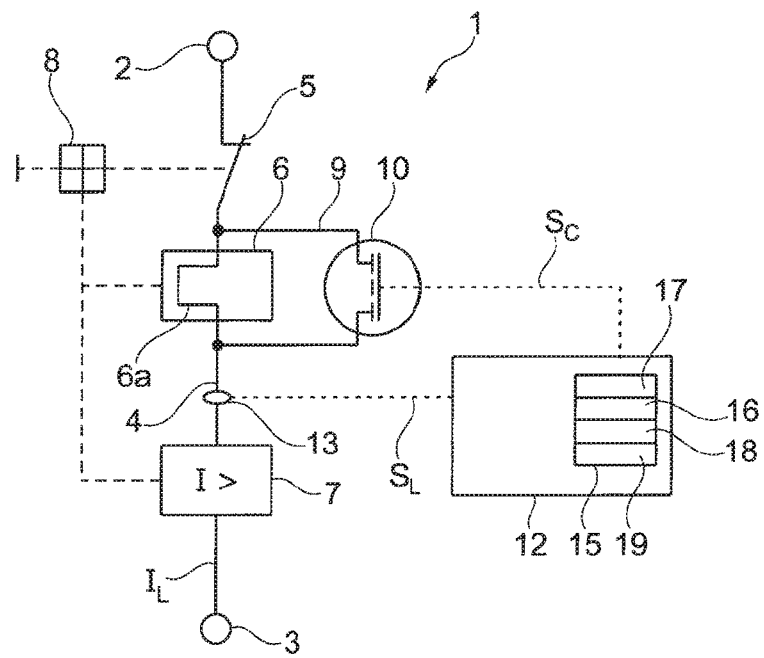
FIG. 1 illustrates a thermal-magnetic circuit breaker with a semiconductor connected to a control circuit in a bypass to the thermal tripping device.

FIG. 1 schematically shows a circuit breaker 1 with thermal-magnetic tripping and a bypass operation. For this purpose, the circuit breaker 1 comprises, between an input terminal 2 and a load terminal 3, a current path 4 with a disconnect switch 5 in the form of a fixed and a moving contact. A thermal tripping device 6 with or in the form of a bimetal 6a heated, for example, by means of a heating wire, is arranged downstream of the disconnect switch 5 within the current path 4. A magnetic tripping device 7 in the form of a magnetic coil 7a with an iron core 7b (FIG. 3) for tripping an impact armature is arranged downstream of this thermal tripping device 6. Both the thermal tripping device 6 and the magnetic tripping device 7 act via a switch lock 8 in the form of a releasable latching mechanism on the disconnect switch 5 in order to open the latter with a time delay or instantaneously when overcurrent or a short-circuit occurs. The row arrangement of the thermal tripping device 6 and the magnetic tripping device 7 within the current path 4 can also be interchanged.

In the event of overload and short circuit, the thermal-magnetic circuit breaker 1 thus leads to the disconnection of the circuits connected to the current path 4 via the input terminal 2 and the load terminal 3. In the case of thermal tripping, the force for tripping the switch lock 8 is obtained from the expansion, for example, of the bimetal of the thermal tripping device 6 as a result of heating due to ohmic heating power. In the case of magnetic tripping, the electromagnetic force effect of the current-conducting coil of the magnetic (electromagnetic) tripping device 7 acts on the impact armature.

In the case of a shown thermal-magnetic circuit breaker 1, heat losses occur due to the operating current, which is hereinafter also referred to as load current $I_L$, which flows via the ohmic resistors, which essentially includes the bimetal of the thermal tripping device 6 and the coil of the magnetic-electromagnetic tripping device 7. If a current, which is below the respective rated current $I_N$ and thus is smaller than this, flows through the current path 4 and thus through the circuit breaker 1, then the power loss is to be reduced by decreasing the ohmic resistance of the circuit breaker 1. This is achieved by the fact that the functional component of the respective tripping device, in this case the bimetal of the thermal tripping device 6 and/or the coil of the magnetic/electromagnetic tripping device 7, is bridged in a manner of low-resistance. This bypass 9 represents a low-resistance connection, which is realized with the aid of a switching element.

Figure 2:
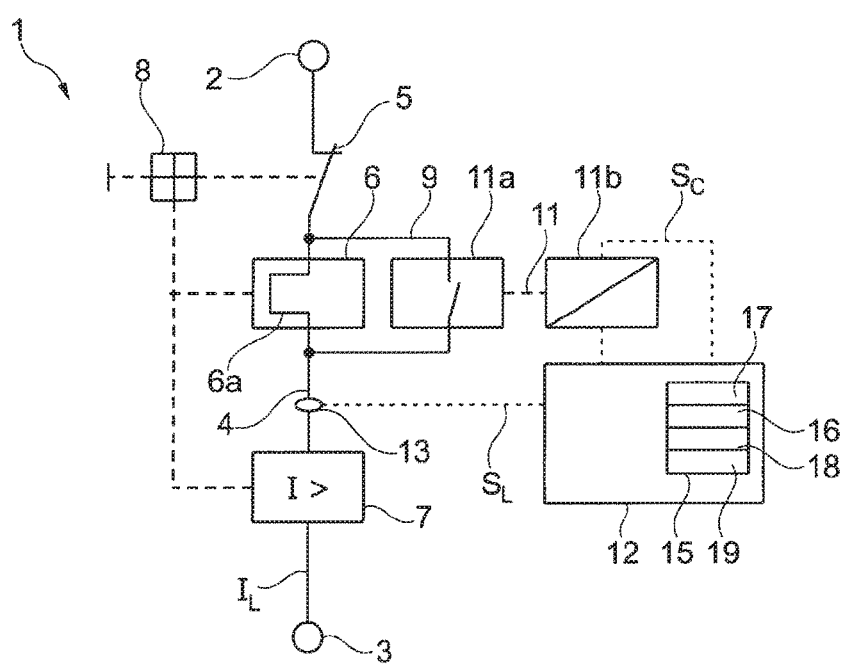
FIG. 2 illustrates a circuit breaker with a relay wired to a control circuit in the bypass to the thermal tripping device.

Whereas in FIG. 1, a transistor or power semiconductor 10, as a switching element, forms the bypass 9 or is switched on in this circuit, in the embodiment of the otherwise similarly constructed circuit breaker 1 shown in FIG. 2, a relay contact 11a of a relay 11 activated via a relay coil 11b is wired into the bypass 9. To both switching elements 10, 11, a control circuit 12 is assigned, to which a sensor signal $S_L$, which corresponds or is proportional to the current load current $I_L$, is fed. This is generated by a current sensor 13, which detects the effective load current $I_L$ in the current path 4.

Depending on the magnitude of the detected load current $I_L$, the control device 12 generates a control signal $S_C$ for activating the switching element 10, 11. As a result, the bypass 9 is switched on at a load current $I_L$, which falls below a threshold value $I_{Nenn}$ (FIG. 4), and is thus activated, or shut off or deactivated by opening the respective switching element 10, 11 when the detected load current $I_L$ exceeds the threshold value $I_{Nenn}$. In this case, the load current $I_L$ is exclusively routed via the tripping devices 6, 7, so that these trip, if necessary, in the event of overcurrent or short-circuit.

Figure 3:
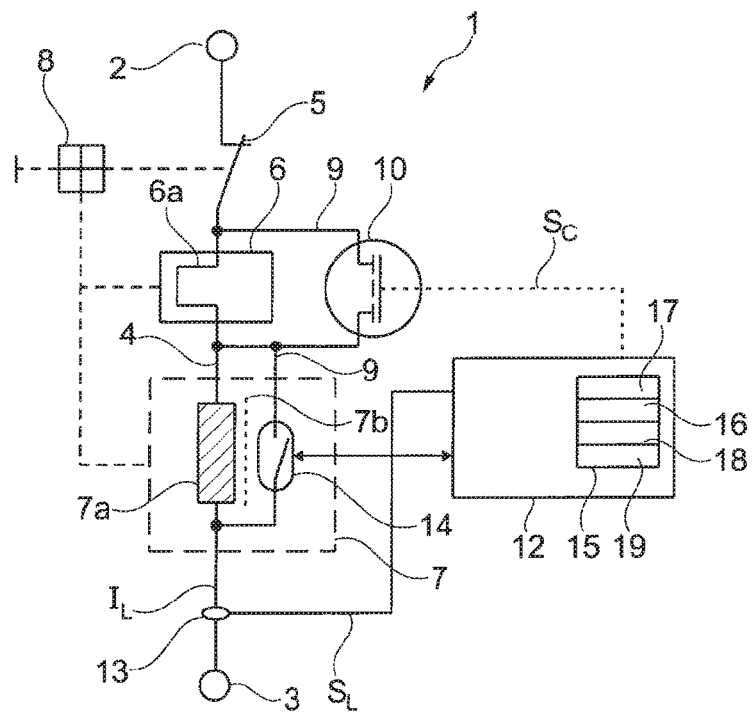
FIG. 3 illustrates a circuit breaker with a reed contact in the bypass to the thermal/magnetic tripping device.

In the case of the circuit breaker 1 shown schematically in FIG. 3, on the one hand, a transistor 10 is connected as a switching element in the bypass 9, parallel to the thermal tripping device 6 or the bimetal 6a thereof, and, as a further switching element, a reed contact 14. This is preferably integrated into the magnetic tripping device 7, i.e., preferably into the coil body of the magnetic coil 7a. The reed contact 14 is activated by the magnetic coil 7a of the magnetic tripping device 7 of the circuit breaker 1 and responds when a predetermined threshold value is exceeded, preferably when the load current $I_L$ has reached a limit value $I'_N$ of, for example, 80% of the rated current $I_N$ ($I'_N=0.8 \cdot I_N$).

As long as the load current $I_L$ falls below this threshold value $I'_N$, which is smaller than the threshold value ($I_{Nenn}$), the bimetallic element 6a as a functional component of the thermal tripping device 6 is shorted with the transistor 10 as a switching element, while the reed contact 14 is open. This is closed, and the transistor bridging the bimetal 6a is opened when the load current $I_L$ exceeds the threshold value $I'_N$.

The control circuit 12 retrieves the switching state of the reed contact 14. At the same time, the control circuit 12 turns on the transistor 10, which is connected in the bypass 9 and which short circuits the thermal tripping device 6 of the circuit breaker 1 or the bimetal 6a thereof. As soon as the load current $I_L$ exceeds the threshold value $I'_N$ and the reed contact 14 responds, the transistor 10 is opened via the thermal tripping device 6 or via the bimetal 6a thereof, and the load current $I_L$ flows exclusively through the current path 4 so that the circuit breaker 1 operates as a regular thermal-magnetic circuit breaker 1. If the load current $I_L$ again falls below the threshold value $I'_n=0.8 \cdot I_{Nenn}$, the reed contact 14 opens and the process runs in reverse.

Figure 4:
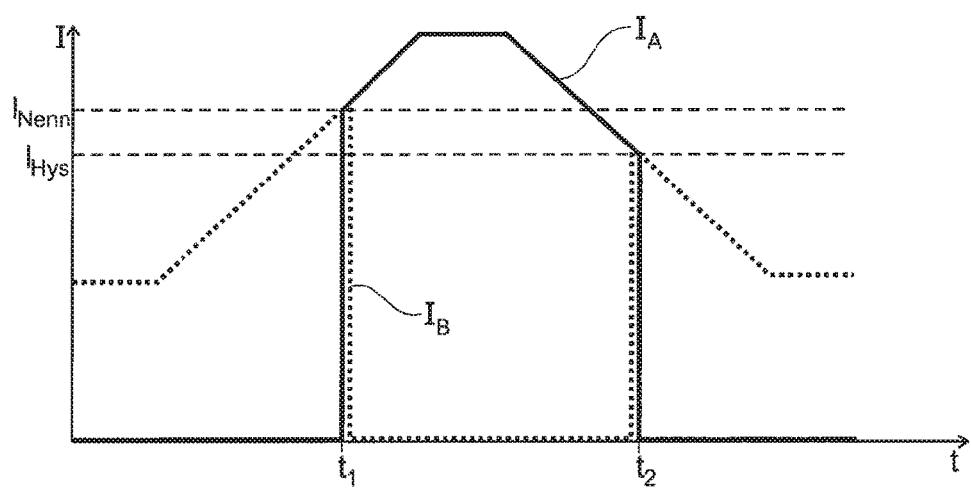
FIG. 4 is a current/time diagram or a typical current profile with optimal bypass and tripping mode.

FIG. 4 shows, in a current-time diagram I, t, an idealized current profile $I_B$ via the bypass 9 as well as the current profile (trip current) $I_A$ over the functional component bridged via the bypass 9, in the present case over the bimetal of the thermal tripping device 6. This current profile $I_A$ is shown as a solid line, while the current profile $I_B$ via the bypass 9 is displayed as a dotted line.

The control circuit 12 controls the respective switching element 10, 11 in dependence on the current $I_L$ detected by means of the current sensor 13 such that the bypass 9, which is low-resistance in comparison with the current path 4, is activated and the corresponding functional element 6a, 7a is bridged in the current path 4 until the threshold value $I_{Nenn}$, hereinafter also referred to as the current threshold, is reached, which in the exemplary embodiment corresponds to the rated current $I_N$ of the circuit breaker 1. If this current threshold $I_{Nenn}$ is reached or exceeded, for example, at a time $t_1$, the bypass 9 is deactivated in that the respective switching element 10, 11, 14 is opened or opens, resulting in solely the load current $I_L$ flowing through the current path 4.

Hence, the circuit breaker 1 assumes its typical protective function and, in the event of overcurrent, trips thermally with a time-delay or, in the case of a short-circuit, trips magnetically/electromagnetically without delay. If at a later time the detected load current $I_L$ again falls below the current threshold $I_{Nenn}$, the bypass 9 is activated with a certain hysteresis current limit $I_{Hys}$ at time $t_2$, and the respective switching element 10, 11, 14 is closed by the appropriate control.

The current and/or voltage supply of the control circuit 12 advantageously takes place by means of a functional component 15 according to the principle of energy harvesting. This functional component 15, which in the exemplary embodiment is assigned to the control circuit 12, comprises an energy converter 16 for converting the energy supplied by a switch-internal or else switch-external source 17 into the supply voltage or into the supply current for the control circuit 12. In addition, the functional component 15 based on the principle of energy harvesting comprises a current and/or voltage regulator 18 and an energy store 19.

In addition to or instead of the thermal or magnetic tripping device, the switching device may also have an electronic trip unit for interrupting the current circuit, which comprises the current path 4, in the event of overcurrent or short-circuit. The functional component bridged by means of the bypass can then be a shunt, which is used for current measurement, or another electrical or electronic component of the circuit breaker. The function component 15 for the utilization or realization of energy harvesting in combination with an electronic circuit breaker is also advantageous in that the harvested energy is used by the switch-internal or external source 17 for the self-supply of the control circuit usually associated with this type of electronic circuit breaker, and is converted in particular by means of the converter 16 into a supply voltage and/or a supply current, or, if necessary, is controlled by means of the current or voltage regulator 18, and when necessary, is temporarily stored by means of the accumulator 19.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit breaker comprising:
    an input terminal;
    a load terminal;
    a switching device arranged in a current path between the input terminal and the load terminal, the switching device having a thermal and/or magnetic tripping device for an interruption of a current circuit, which comprises the current path, in an event of an overcurrent or a short-circuit,
    wherein a functional component of the switching device is connected in the current path and is bridged via a bypass, which carries a current detected via a current sensor when the current is below a current threshold and is shut off when the current threshold is exceeded, and
    wherein the current and/or voltage supply of the switching device and/or of the control circuit is provided via a function component based on a principle of energy harvesting.

2. The circuit breaker according to claim 1, wherein the bypass is a switching element connected in parallel to the functional component.

3. The circuit breaker according to claim 2, wherein the switching element is a semiconductor switch, a relay, and/or a reed contact with an associated control circuit that is connected to the current sensor.

4. The circuit breaker according to claim 1, wherein the functional component based on the principle of energy harvesting comprises an energy converter for converting the energy supplied by a switch-internal or external source into a supply voltage or into a supply current for the control circuit.

5. The circuit breaker according to claim 4, wherein the functional component based on the principle of energy harvesting comprises a current and/or a voltage regulator.

6. The circuit breaker according to claim 1, wherein the functional component based on the principle of energy harvesting comprises an energy store.

7. A method for a low power-loss operation of a circuit breaker, which comprises a switching device with a thermal and/or magnetic tripping device for an interruption of a current path in an event of an overcurrent or a short-circuit, and with a comparatively low-resistance bypass to a functional component of the switching device that is connected in the current path, the method comprising:
  detecting a load current flowing through the current path; and
  comparing the detected load current to a threshold value, the load current being carried via the bypass when the current falls below the threshold value and the bypass being shut off when the threshold value is exceeded,
  wherein the supply of a control circuit of the switching device and/or of a switching element switched into the bypass is based on a principle of energy harvesting from an energy source located in an operational range of the circuit breaker, and
  wherein the harvested energy is converted into a supply voltage and/or a supply current for the control circuit.

8. The method according to claim 7, wherein the functional component of the thermal tripping device is short-circuited with a transistor as the switching element as long as the load current falls below a limit value that is lower than the threshold value, and wherein a reed contact interacting with the functional component of the electromagnetic tripping device is closed as a further switching element and the switching element bridging the functional component of the thermal tripping device is opened when the load current exceeds the limit value.

* * * * *